US009560094B2

(12) United States Patent
Pal et al.

(10) Patent No.: US 9,560,094 B2
(45) Date of Patent: Jan. 31, 2017

(54) SYSTEM AND METHOD FOR IDENTIFYING AND ANALYZING PERSONAL CONTEXT OF A USER

(71) Applicant: Tata Consultancy Services Limited, Mumbai (IN)

(72) Inventors: Arpan Pal, Kolkata (IN); Balamuralidhar Purushothaman, Bangalore (IN); Prateep Misra, Kolkata (IN); Sunil Kumar Kopparapu, Thane (IN); Aniruddha Sinha, Kolkata (IN); Chirabrata Bhaumik, Kolkata (IN); Priyanka Sinha, Kolkata (IN); Avik Ghose, Kolkata (IN)

(73) Assignee: Tata Consultancy Services Limited (IN)

( * ) Notice: Subject to any disclaimer, the term of this patent is extended or adjusted under 35 U.S.C. 154(b) by 159 days.

(21) Appl. No.: 14/376,536

(22) PCT Filed: Jan. 22, 2013

(86) PCT No.: PCT/IN2013/000045
§ 371 (c)(1),
(2) Date: Aug. 4, 2014

(87) PCT Pub. No.: WO2013/118144
PCT Pub. Date: Aug. 15, 2013

(65) Prior Publication Data
US 2014/0351337 A1    Nov. 27, 2014

(30) Foreign Application Priority Data
Feb. 2, 2012  (IN) .......................... 313/MUM/2012

(51) Int. Cl.
*H04L 29/06* (2006.01)
*H04W 4/02* (2009.01)
(Continued)

(52) U.S. Cl.
CPC .......... *H04L 65/403* (2013.01); *G01S 5/0257* (2013.01); *G09B 19/06* (2013.01); *H04L 67/306* (2013.01);
(Continued)

(58) Field of Classification Search
CPC ..................................... H04L 65/403
(Continued)

(56) References Cited

U.S. PATENT DOCUMENTS 5,844,415 A * 12/1998 Gershenfeld .......... B60N 2/002
324/663
6,823,190 B2  11/2004 Ford et al.
(Continued)

FOREIGN PATENT DOCUMENTS

CN   WO 2012000169 A1 *  1/2012  ....... G06F 17/30035
CN   WO 2013063778 A1 *  5/2013  ............ H04L 67/30
WO   WO2012000169 A1     1/2012

OTHER PUBLICATIONS

Beach et al., "Fusing Mobile, Sensor, and Social Data to Fully Enable Context-Aware Computing", 2010.*
(Continued)

*Primary Examiner* — O. C. Vostal
(74) *Attorney, Agent, or Firm* — Finnegan, Henderson, Farabow, Garrett, & Dunner, LLP

(57) ABSTRACT

A method and system for identifying personal context of a user having a portable mobile communication device at a particular location for deriving social interaction information of the user, wherein the user within a predefined range is identified using personal context of the user at the par-
(Continued)

ticular location and the identified personal context of the user is assigned with the confidence value. Further the current location information of the user within the particular location is obtained by fusing assigned confidence value. Further the proximity of the user in the current location is estimated by finding the accurate straight line distance between users. Further the two users having similar current location information at the particular location are grouped together with the predefined density criteria. Finally the social interaction information of the user is derived by multimodal sensor data fusion at the fusion engine and represented using a human network graph.

20 Claims, 5 Drawing Sheets

(51) Int. Cl.
| | |
|---|---|
| H04W 4/08 | (2009.01) |
| G01S 5/02 | (2010.01) |
| H04L 29/08 | (2006.01) |
| G09B 19/06 | (2006.01) |
| H04M 1/725 | (2006.01) |
| G06Q 30/02 | (2012.01) |

(52) U.S. Cl.
CPC ........... *H04M 1/72569* (2013.01); *H04W 4/02* (2013.01); *H04W 4/08* (2013.01); *G06Q 30/02* (2013.01); *H04M 1/72572* (2013.01)

(58) Field of Classification Search
USPC ........................................................ 709/204
See application file for complete search history.

(56) References Cited

U.S. PATENT DOCUMENTS

| | | | |
|---|---|---|---|
| 8,013,731 B2 | 9/2011 | Weaver et al. | |
| 8,171,025 B2 | 5/2012 | Tsai et al. | |
| 8,583,139 B2 | 11/2013 | Jung et al. | |
| 8,789,064 B2 | 7/2014 | Tobe et al. | |
| 8,880,366 B2* | 11/2014 | Hampel | G01D 4/008 702/62 |
| 2003/0126258 A1* | 7/2003 | Conkright | G06F 11/0748 709/224 |
| 2003/0202106 A1* | 10/2003 | Kandleinsberger | H04N 5/23293 348/207.99 |
| 2004/0198373 A1* | 10/2004 | Ford | H04M 3/42229 455/456.1 |
| 2004/0254998 A1* | 12/2004 | Horvitz | G06Q 10/107 709/206 |
| 2005/0012723 A1* | 1/2005 | Pallakoff | G06F 1/1616 345/173 |
| 2005/0076013 A1 | 4/2005 | Hilbert et al. | |
| 2005/0259367 A1* | 11/2005 | Haake | H01H 3/142 361/1 |
| 2006/0025871 A1* | 2/2006 | Khalil | G05B 9/03 700/21 |
| 2006/0028326 A1* | 2/2006 | Haas | B60C 23/0408 340/426.33 |
| 2006/0148528 A1* | 7/2006 | Jung | G06Q 10/109 455/566 |
| 2006/0250980 A1* | 11/2006 | Pereira | H04L 12/2803 370/254 |
| 2007/0035182 A1* | 2/2007 | Wellhoefer | B60R 21/0136 307/120 |
| 2008/0068156 A1* | 3/2008 | Shimokawa | H04W 84/18 340/539.22 |
| 2008/0130972 A1* | 6/2008 | Miller | G06F 19/321 382/131 |
| 2008/0243439 A1* | 10/2008 | Runkle | G06K 9/3241 702/188 |
| 2009/0234467 A1* | 9/2009 | Sabe | G05B 13/0265 700/29 |
| 2010/0123603 A1* | 5/2010 | Nally | B63B 43/00 340/984 |
| 2010/0161541 A1* | 6/2010 | Covannon | G06F 17/30032 706/47 |
| 2010/0284290 A1 | 11/2010 | Williams | |
| 2011/0055212 A1 | 3/2011 | Tsai et al. | |
| 2011/0133038 A1* | 6/2011 | Kiss, Jr. | B61L 29/24 246/126 |
| 2011/0172918 A1* | 7/2011 | Tome | G01C 21/165 701/500 |
| 2011/0246490 A1 | 10/2011 | Jonsson | |
| 2011/0283291 A1 | 11/2011 | Tobe et al. | |
| 2012/0079019 A1* | 3/2012 | Miettinen | G06Q 50/00 709/204 |
| 2012/0319989 A1* | 12/2012 | Argiro | G06F 3/041 345/174 |
| 2013/0103759 A1* | 4/2013 | Blom | H04W 4/206 709/204 |
| 2013/0168954 A1* | 7/2013 | Koren | G09B 5/062 281/15.1 |
| 2013/0198397 A1* | 8/2013 | Zhang | H04W 4/001 709/228 |
| 2013/0305062 A1* | 11/2013 | Falk | G06F 21/31 713/193 |
| 2014/0297248 A1* | 10/2014 | Li | H04L 67/30 703/21 |

OTHER PUBLICATIONS

Dargham et al., "Fusing Facial Features for Face Recognition", 2012.*
Dostal et al., "The Potential of Fusing Computer Vision and Depth Sensing for Accurate Distance Estimation", 2013.*
Upcity, "Social Fusion Digital Marketing", 2016.*
Wu, "Sensor Data Fusion for Context-Aware Computing Using Dempster-Shafer Theory", 2003.*
Toshiki Iso, Norihiro Kawasaki and Shoji Kurakake, "Personal Context Extractor with Multiple Sensors on a Cell Phone", Network Laboratories NTT DoCoMo, Inc., Nov. 25, 2010, (5 pages).
Heng-Tze Cheng, Senaka Buthpitiya, Feng-Tso Sun, and Martin Griss, "OmniSense: A Collaborative Sensing Framework for User Context Recognition Using Mobile Phones", Carnegie Mellon Silicon Valley 2010 (1 page).
Michele Amoretti, Sergio Copelli, Folker Wientapper, Francesco Furfari, Stefano Lenzi and Stefano Chessa, "Sensor data fusion for activity monitoring in the PERSONA ambient assisted living project", Journal of Ambient Intelligence and Humanized Computing, DOI 10.1007/s12652-011-0095-6, 2011 (20 pages).
International Search Report mailed on Aug. 15, 2013 in International Application No. PCT/IN2013/000045 (2 pages).

* cited by examiner

SYSTEM AND METHOD FOR IDENTIFYING AND ANALYZING PERSONAL CONTEXT OF A USER

CROSS-REFERENCE TO RELATED PATENT APPLICATIONS

This application is a National Stage Entry under 35 U.S.C. §371 of International Application No. PCT/IN2013/000045, filed on Jan. 22, 2013, which claims priority from Indian Patent Application No. 313/MUM/2012, filed on Feb. 2, 2012. The entire contents of the above-referenced applications are expressly incorporated herein by reference for all purposes.

FIELD OF THE INVENTION

This invention generally relates to the field of personal context identification of a person. More particularly, the invention relates to a system and method for personal context identification for deriving social interaction information of the person.

BACKGROUND OF THE INVENTION

Analysis of a person's behavior has been an important aspect that has a plurality of applications in the field of marketing, organizational development etc. Due to this the field of personal context analysis is gaining wide importance. Specifically organizations employing a large number of employees are concerned to analyze the behavior of an individual for faster and better growth of the organization. The increasing need of analysis in terms of personal context has led to increasing growth in the field of Organizational Behavior Analysis, Workspace Ergonomics Analysis, Discovering the user's physical interaction network, User Studies Analysis, Market Study and Real-time Usage capture etc.

A number of technologies are available in the market for analyzing social behavior of a person using the reality mining techniques and other related aspects such as work cultures which have dedicated software and hardware requirements of the system. Such systems analyze Organizational Behavior based on user context sensing via specially designed devices that incorporate all required sensors. These devices interact with each other and a server to gather information associated with an individual. However, such systems and devices pose a threat as data related to a number of individuals is required to be transmitted to a back-end server for further processing, thereby raising privacy concerns. Moreover, further refinement and data processing at a distant located server leads to heavy transmission costs. Further, such data transmission leads to extra usage of battery power in order to transmit each and every particular sensed detail to the back-end server without processing it.

Furthermore, an additional device is required to be deployed at an extra cost in order to track an individual's behavior. Such a device does not generally has an always-on connectivity to dump the user data collected to the back-end server for further analysis—it needs to be docked to a special data collection station to transfer the data. Also, such available devices do not have provision to connect to additional external sensors over wireless, so the extensibility of the system to newer applications is limited.

Also, current solutions for context recognition and analysis using the reality mining techniques are dependent on wearable sensors and mobile devices for sensing a user's activity, location and proximity with respect to other users. There are different algorithms used to arrive at the conclusion of a user's attributes in the real world. Such results are often inaccurate due to errors in sensor readings and change in ambient environment. Such inaccuracies can cause discrepancies and malfunctioning in the case of ubiquitous applications. Furthermore, the sensors used are very limited in the kind of data they provide and most of the time specialized sensors are needed for deployment.

As a result there is growing need to integrate a personal context analysis system with a more efficient, widely available and user-friendly device which is easy to carry and simple to operate, and thereby eliminating the need for a separate special device or data collection system. There is also a need to process the raw sensory data at the sensing device itself to preserve battery life of the device (radio communication takes up most of the battery life), and thereby also addressing the privacy preservation and data transmission cost concerns.

Moreover, a provision to connect to additional external sensors through existing communication means like USB, Wi-Fi or Bluetooth will also lead to better grasp of an individual's behavior. Further the personal context analysis will also lead to create a social network based on real life fixations and affinities of the user.

OBJECTS OF THE INVENTION

The principle object of the present invention is to implement a real-time personal context identification system using reality mining techniques by means of a widely available mobile communication device.

Another significant object of the invention is to use the existing sensing means present in a mobile communication device such as an on-board microphone-speaker combine, accelerometer, camera, etc, soft/virtual sensors like networking website profile of the user, email headers of the user, Rich Site Summary (RSS) feed and social blog profile of the user, along with building management system (BMS) access control which works on real-time data brought into the phone using various data communication methods to capture an individual's behavior.

Another significant object of the invention is to represent the social network of the user in the form of graphs depicting the social interaction information of the user's interaction while working in a cubicle, interaction while leading a meeting, interaction of a presenter in a session, a passive listener in meeting, interaction during a group discussion and the like.

Another object of the invention is to assign the confidence value to the existing sensing means capturing the user's information.

Another object of the invention is to group users having similar location information.

Another object of the invention is to fuse the multimodal data from various sources at the backend server.

Yet another object of the invention is to provide connectivity with one or more external sensing devices for capturing additional details regarding the individual user.

Yet another object of the invention is to reduce battery consumption and transmission cost of the system by pre-processing the sensor information on the mobile communication device itself.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The present invention provides a method and system for identifying personal context of at least one user having a portable mobile communication device at a particular location for deriving social interaction information of the user. The social interaction information of the user may be the physical interaction between the two users.

In an embodiment of the present invention, a system and method for capturing and processing multi-sensor data received from a mobile communication device for the purpose of personal context analysis is provided. In an aspect, the mobile communication device may be a mobile phone, tablet or any such mobile device with adequate processing power and suitably adapted with required sensors. The mobile communication device may also be connected to one or more external sensors such as ultrasound sensors, EEG sensors, and the like. A low-energy-consuming and low-sampling-rate data acquisition/capturing method is utilized for capturing the sensory data. The sensing process will be aware of the device context such as battery level, memory usage etc towards an efficient and robust sensing strategy. Further, onboard analytics of the sensor data on the mobile communication device itself is utilized for extracting one or more parameters. For example, accelerometer analytics for activity detection, baseband communication using ultrasound for localization and proximity detection, microphone captured audio analytics for emotion detection and neighborhood sensing, camera for ambient lighting detection and optional analysis of external physiological sensors such as EEG sensor for further insights into user context. The system enables the sending of onboard analyzed parameters from the mobile communication device as a gateway to a back-end system over a network connection such as the Internet. In an aspect, the onboard analyzed parameters may be encrypted for security/privacy purposes. In another aspect, the mobile device may collaborate and exchange information between one-another to get more context information.

In an embodiment of the invention a method is provided for identifying personal context of at least one user having a portable mobile communication device. The method includes determining a location of at least one user within a predefined range by identifying a personal context of the user at the location, wherein the personal context of the user is identified using at least an external sensor and an internal sensor embedded in the mobile communication device, assigning predefined confidence values to the identified personal context, obtaining current location information of the user, grouping, based on predefined density criteria, at least two users having similar current location information at the location of the user, estimating, using the external sensor and internal sensor, a straight line distance between the at least two grouped users, and deriving social interaction information of the user by fusing the current location information of the user, the estimated straight line distance, and data received from a web sensor.

All these parametric information collected from sensors may then be further analyzed at the back-end server for creating individual and aggregated user context that can be used for Organizational Behavior Analysis, Workspace Ergonomics Analysis, Discovering the user's physical interaction network and also for Measuring and analyzing user response in User Studies etc. The overall system is also beneficial for Learning the user personal context in general and applying the knowledge to create adaptive intelligent systems that respond with action or information that is relevant to the user and for capturing and analyzing user-specific real-time service consumption data. This information is stored in proper formats and will also enhance in population modeling and mass people behavioral modeling in a city while doing urban city modeling.

In an embodiment of the invention a system is provided for the mobile communication device which further comprises an internal sensor, a processing module, an internal memory, a transmission module, and a switching module. The internal sensor is adapted for sensing a personal context of the user and sending the personal context to a processing module of the mobile communication device, the processing module is adapted to perform on-board processing of sensory data received from an external sensor and the internal sensor, and the internal memory is communicatively coupled with the processing module and adapted to store the processed sensory data. The transmission module is adapted to transmit the processed sensory data to a back end server hosting a fusion engine and communicatively coupled to a database adapted to store fused confidence values, fused current location information of the user, and the personal context of the user and a switching module adapted for switching between other mobile device applications of the internal sensor and the personal context of the user when an interrupt is generated from regular activities of the mobile communication device. Further, the external sensor is adapted for sensing the personal context of the user and sending the personal context of the user to the processing module via an external sensor interface of the mobile communication device, and the back end server is adapted for fusing assigned predefined confidence values of the personal context of the user, current location information of the user, and a derived accurate straight line distance between at least two users in a group at a location of the user. The system further comprises a fusion engine, a front end application and a database.

In another embodiment of the invention a system further comprises a localization module; a confidence value assignment module; a current location identification module; a proximity estimation module and a grouping module. The localization module is adapted for locating at least one user within a predefined range by identifying the personal context of the user at the location, wherein the personal context of the user is identified using the external sensor and the internal sensor. The confidence value assignment module is adapted for assigning the predefined confidence values to the identified personal context of the user. The current location identification module is adapted for obtaining current location information of the user within the location by fusing the assigned confidence values using a fusion engine. The grouping module is adapted for grouping, using a predefined density criteria, at least two users having similar current location information at the location. The proximity estimation module is adapted for estimating, using the external sensor and the internal sensor, an accurate straight line distance between the grouped at least two users. The fusion engine is adapted for deriving the social interaction information of the user by fusing the current location information of the user and estimated accurate straight line distance.

In yet another of the invention, a non-transitory computer readable medium storing machine readable instructions is disclosed. The instructions are executable by one or more processors for determining a location of at least one user within a predefined range by identifying a personal context of the user at the location, wherein the personal context of the user is identified using at least an external sensor and an internal sensor embedded in the mobile communication device, assigning predefined confidence values to the identified personal context, obtaining current location information relating to the user at the location by fusing the assigned confidence values, grouping, based on predefined density criteria, at least two users having similar current location information at the location of the user, estimating, using the external sensor and internal sensor, a straight line distance between the at least two grouped users, and deriving social interaction information of the user by fusing the current location information of the user, the estimated straight line distance, and data received from a web sensor.

The above said system, method, and computer-readable medium are preferably for identifying personal context of at least one user having a portable mobile communication device at a particular location for deriving social interaction information of the user but also may be used for many other applications.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific system and method disclosed in the drawings.

DETAILED DESCRIPTION OF THE INVENTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

One or more components of the invention are described as module for the understanding of the specification. For example, a module may include self-contained component in a hardware circuit comprising of logical gate, semiconductor device, integrated circuits or any other discrete component. The module may also be a part of any software program executed by any hardware entity for example processor. The implementation of module as a software program may include a set of logical instructions to be executed by the processor or any other hardware entity. Further a module may be incorporated with the set of instructions or a program by means of an interface.

The disclosed embodiments are merely exemplary of the invention, which may be embodied in various forms.

Figure 1:
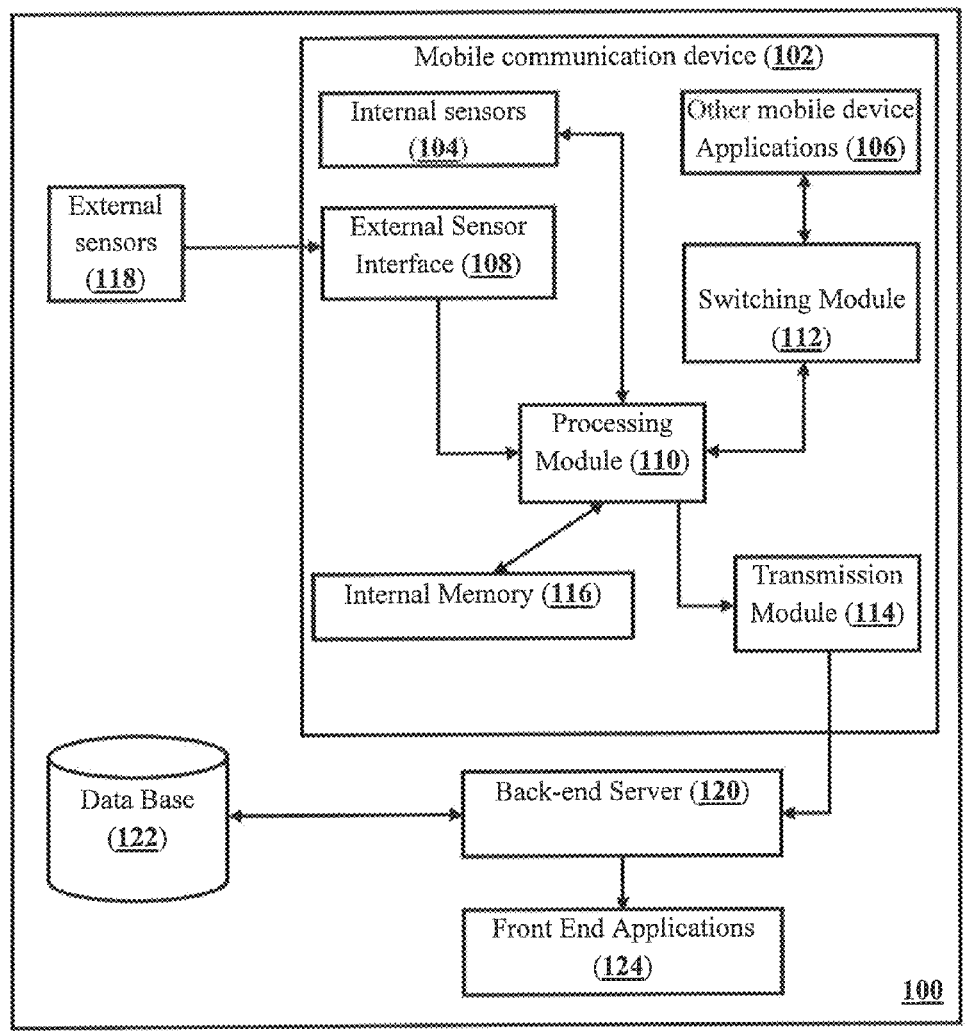
FIG. 1 illustrates components of a system for identifying personal context, in accordance with an embodiment.

FIG. 1 refers to a system (100) for personal context identification in accordance with an exemplary embodiment of the invention. The system (100) is constructed using one or more modules functioning independently or in combination to perform personal context analysis. The system (100) comprises of Mobile communication device (102) that further comprises of internal sensors (104) like accelerometer, camera, GPS, microphones and the like for sensing user activities, location, audio, and ambient light. The internal sensors further provide means for localization and proximity detection using ultrasonic and upper audio band. An external sensor interface (108) connects external sensors (118) like wearable EEG having low-energy-consumption and low-sampling-rate with the mobile communication device (102). A processing module (110) and internal memory (116) performs onboard analytics of the sensor data captured by various internal and external sensors. The mobile communication device (102) further comprises a transmission module (114) for transmitting relevant information to the backend server (120) and a switching module (112) for switching between other mobile device applications (106) of internal sensors (104) and personal context analysis when an interrupt is generated from regular activities of mobile communication device (102).

The processing module (110) processes the sensed data, separates the context data and transmits only the relevant information for personal context identification to the backend server (120) with the help of transmission module (114). The backend server (120) processes and analyzes the information received from the transmission module (114) present in the mobile communication device (102). The backend server (120) then sorts and processes each-and-every information related to a specific user. This information is stored into the database (122) and is accessed by the front end applications (124) through backend server (120) for creating individual and aggregated user context that can be used for Organizational Behavior Analysis, Workspace Ergonomics Analysis and also for Measuring and analyzing user response in User Studies etc.

The frontend application (124) through backend server (120) is further adapted for rendering the derived social interaction information of the user in the form of statistic representation. The statistic representation may include the multimodal social graph with edges having multiple attributes and can be queried along multiple dimensions on-demand. The social graph can be prepared by reading the attributes from two fold sensor input, the first being the analyzed output of the physical sensors, and the second being the feed from web based soft sensors. The analyzed data is used to generate the nodes and edges of the social graph.

Figure 2:
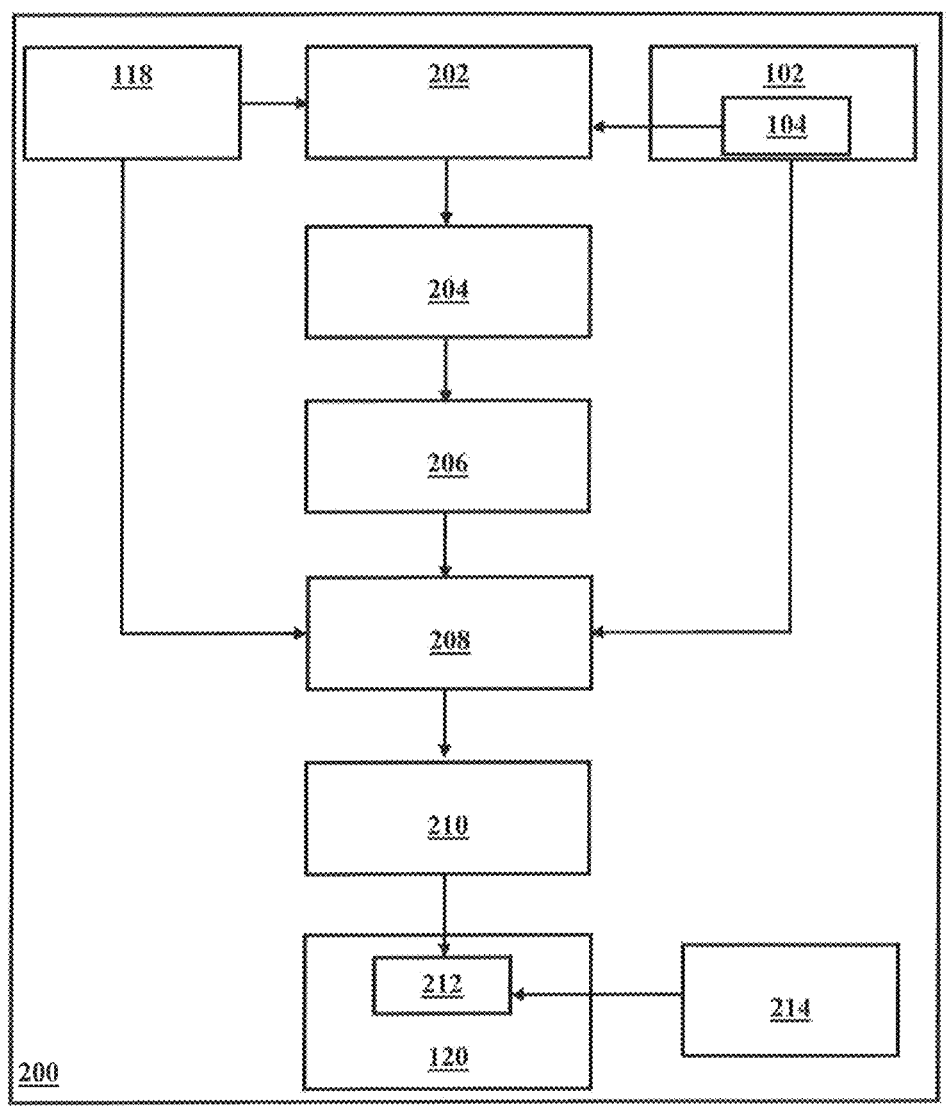
FIG. 2 represents a block diagram for personal context based social interaction system, in accordance with an embodiment.

FIG. 2 represents the block diagram for personal context based social interaction deriving system (200). The system comprises of a localization module (202); a confidence value assignment module (204); a current location identification module (206); a proximity estimation module (208); a grouping module (210); and a fusion engine (212) hosted by the back end server (120).

According to an exemplary embodiment of the present invention, the system (200) is configured to derive personal context based social interaction. The personal context of the user comprises of the identity of the user i.e. who the person is, the proximity of the user i.e. the closeness and the duration of the user to other individuals or users, the activities of the user i.e. working in cubicle, discussion room, corridor and the like, and the location of the user. The social interaction of the user is the physical interaction of the user with other individuals. The system (200) comprises of the localization module (202) adapted to locate the user within a predefined range of the various sources for identifying the personal context of the user at a particular location. The personal context of the user is identified using the external sensors (118) and the internal sensors (104) embedded in the mobile communication device (102). Further the confidence value assignment module (204) is used to assign the predefined confidence values to the identified personal context of the user depending on the sources from which the user is localized. Precise current location information of the user inside the particular location is obtained using the current location identification module (206). The precise current location information is obtained by fusing the assigned confidence value of personal context of the user using a fusion engine (212). Further the system groups the two users located with the similar current location information using the grouping module (208). The grouping of the two users is decided based on certain with predefined density criteria. The accurate straight line distance between the two users in a group at the particular location is derived using the proximity estimation module (210). The fusion engine (212) which is hosted by the back end server (120) is used to derive the social interaction information of the user by fusing the current location information of the user and derived accurate straight line distance between the two users in a group at the particular location.

The external sensors (118) are selected from the group comprising of access control entry/exit information from building management system (BMS), surveillance using depth camera like 3D camera, wearable EEG, ultrasound and the like. The internal sensors (104) are embedded in the mobile communication device (102) are selected form the group comprising of an accelerometer, a magnetometer, a speech recognizer, a gyroscope and a W-Fi signature and the like.

The localization module (202) in which the indoor location detection is captured using access control logs of the buildings, Wi-Fi signatures, magnetometer signatures, accelerometer analytics on mobile phones and the like. The Wi-Fi fingerprinting and/or triangulation based on RSSI can also provide indoor localization. The accelerometer, magnetometer and gyroscope are combined to sense complex motion like walking or climbing stairs or elevator or sitting/standing etc.

The personal context of the user is selected from the group comprising of identity, proximity, activity and location. The identity of the may be captured by the means of the user's mobile phone which is tagged to the user, the user's Smart card while the user passes through BMS, the user's skeletal structure and gait measurements taken using 3D depth cameras and the like. The proximity of the user may be captured by means of the Bluetooth of the user, proximity sensors located in the building structure, infrared proximity sensing and the like. The activity of the user may be captured by the social interaction of the user with the people around which may comprises of information like during presentation, who all are listening? Who is asking questions? During a group discussion and also gesture recognition may be used to identify interactions like handshakes and card exchanges etc. The location of the user may be detect using the localization module (202).

The confidence value assignment module (204) assigns the predefined confidence value to the identified personal context of the user based on the source of information. The predefined confidence value or the confidence score of the internal source and external source shall vary between 0% and 100% but may not inclusive of either bound. For example, the predefined confidence value of the building management system (BMS) data is 100%. The speech recognition software may provide a detection score which may be considered as the confidence value. The localization range from the speech data may be of the order of 10 sq. m. but not limited to that. Similarly the case may be of Wi-Fi signature and accelerometer data. The confidence scores may vary from the sources from which they are captured, depending on how much data is captured and the environment from which the data is captured, the same sensor and analytics might produce very high to very low confidence values.

In an embodiment of the present invention, the joint probability function which is used for finding the location information of an individual user is obtained by the following equation:

$$L_j^1 = \prod_{i=1}^{4} P_{ji}(loc_i/x) \quad (1)$$

Where $P_{ji}(loc_i/x)$ is the probability distribution function of the location of $j^{th}$ individual given the observation from the $i^{th}$ sensor data.

The $P_{ji}(loc_i/x)$ is calculated from Bayes theorem, given below:

$$P_{ji}(loc/x) = \frac{p(x/loc) * p(loc)}{\sum_k p(x/loc_k) * p(loc_k)}$$

Where p(loc) is the prior probability of the location of j. Thus the location of individual j is given by, $$loc_j^1 = \underset{loc_i \in S}{\mathrm{argmax}}\, L_j^1 \quad (2)$$

Where S is the physical space in which the individual j can belong. The confidence score associated with the observation of $L_j^1$ ($loc_j^1$) is $S_j^1$.

In an embodiment of the present invention, the current location identification module (206) obtains precise current location information of the user within the particular location.

In an embodiment of the present invention, the proximity estimation module (208) is used to estimate the proximity for deriving accurate straight line distance between at least two users in a group at the current location by utilizing the external sensors (118) and the internal sensors (104) embedded in the mobile communication device (102) of the user.

In an embodiment of the present invention, the proximity estimation module (208) may use indoor proximity detection using Bluetooth, audio on mobile, 3D depth-camera, real life communications discovery by scanning the e-mail headers of the individual which provides information like To, CC and Subject fields giving an indication of the user's communication with the other people, and the like. The Bluetooth may be used to detect proximity since commercial phones come with class II Bluetooth which provides only short range. The 3D depth cameras provide accurate measurement of distance and direction between people and hence provide a very good source for detecting proximity. The Email files and archives parsed are read using many commercially or open source email tools including the Java mail API.

In an embodiment of the present invention, the mobile based proximity sensing is used as the pair-wise individual for different users of the group of people. From the "mobile proximity sensing", distance d between the individuals j and l, is given by the probability distribution function for the pair (j and i to be at distance d) as is given by $P_{jlm}(d/x)$ The $P_{jlm}(d/x)$ is calculated from Bayes theorem, as below:

$$P_{jlm}(d/x) = \frac{p(x/d) * p(d)}{\sum_{i} p(x/d_i) * p(d_i)}$$

where p(d) is the prior probability of the distance between j and i. hence, $$d_{jl}^m = \underset{d \in S}{\mathrm{argmax}}\, P_{jlm}(d/x) \quad (3)$$

The confidence score $S_{jl}^m$ may be associated with the observation of is $P_{jlm}(d_{jl}^m/x)$.

For the distance d between the individuals j and i, using "3D camera data" is given by the probability distribution function for the pair j and i to be at distance d, as is given by $P_{jlc}(d/x)$. Hence, $$d_{jl}^c = \underset{d \in S}{\mathrm{argmax}}\, P_{jlc}(d/x) \quad (4)$$

The confidence score $S_{jl}^c$ associated with the observation of is $P_{jlc}(d_{jl}^c/x)$. Further, $d_i$=distance ($loc_j$, $loc_i$), is the distance between the locations of individual j ($loc_j$) and individual i ($loc_i$).

In an embodiment of the present invention, the grouping module (210) groups two users having similar current location information at the particular location with the predefined density criteria. The predefined density criteria may be derived employing a density based clustering method.

In an embodiment of the present invention, the clustering algorithm is used to create groups. The clustering algorithm may follow the steps like, the minimum group size is $G_{min}$ and maximum group size is $G_{max}$. The maximum distance of an individual from the centroid of the group is $d_{icmax}$. The Density based clustering (DBSCAN) algorithm may be used to form groups with density criteria 'ϵ' such that there has to be N individual per unit area. The clustering algorithm gives the core groups as clusters and individuals not belonging to any groups are treated as outliers.

In an embodiment of the present invention, the fusion engine (212) is adapted for deriving the social interaction information of the user. The fusion engine (212) is hosted by a back end server (120). The fusion engine is used to fuse the data or information received from the derived accurate straight line distance between the two users in a group at the particular location and a web sensor (214).

In an embodiment of the present invention, the fusion engine (212) the data from all these sensors as well as the web based soft-sensors are fed to the multimodal fusion module. Each sensor may have an error probability and also a confidence score with which it reports a reading. The fusion module reads data from multiple sensors along with mentioned properties for each reading. The engine then infers commonality from reporting of multiple sensors and come up with an aggregated attribute for the edge between the vertices under consideration. For example "proximity" reported by a set of sensors may be fused with audio analysis to arrive at a conclusion such as "conversation". This augmented with a location of conference room can be used to deduce a "meeting" whereas the same will be deduced as "chat" if the location changes to the coffee machine. Another aspect of multimodal sensor fusion may be used for error reduction and cancelation. For example, where 3D Camera reports proximity between two people at a location with a moderate degree of confidence, however the location for one of the persons does not match the location derived from accelerometer. In such a case the 3D camera data may be rejected as a "false positive".

In an embodiment, the web sensor (214) may be selected from the group comprising of social networking website profile of the user, email headers of the user, RSS feed and social blog profile of the user. The social networking sites like Facebook, Twitter etc. provides access to various information's like profile data which is in the form of structured data. This structured data is gathered for separately parsing the structured data to extract the interests of the individual. The interests may provide an important property for the edge of the social graph as two people having a common interest are likely to be connected across that. The structured data mining, unstructured data mining from user's blogs and social posts may be obtained for forming edge attributes. The email headers for the person may be scanned to understand real life communications of the individual, which may provide information like To, CC and Subject fields giving an indication of the user's communication with the other people.

In an embodiment of the present invention, the location information for the $j^{th}$ individual as $loc_j$ is given in equation (2). The corresponding confidence value ($S_j^1$) of the detected location is the ($loc_j$). This is done for all N individuals. We term the location for "j" obtained from equation (2) as $loc_j^1$. The pair-wise distance is computed by "mobile proximity sensing" and "3D camera data" as $d_{jl}^m$ and $d_{jl}^c$ for individual's j and i. The location information of j as derived from "mobile proximity sensing" of j-l pair is sphere centered on $loc_l^1$ with radius $d_{jl}^m$. Thus the probability of the location of j derived from the location of i and the distance between the j-i pair is given by $P(loc_{jl}^m/x)=P(loc_l^1)*P(d_{jl}^m)$.

Combined probability of the location of j derived from all other individuals is given as, $$L_j^m = \prod_{l=1, l \neq j}^{N} P(loc_{jl}^m/x)$$

Finally, the location of j derived from "mobile proximity sensing" is given as, $$loc_j^m = \arg\max_{loc_{jl}^m \in S} (L_j^m) \quad (4)$$

The corresponding score is given as $S_j^m = L_j^m(loc_j^m)$.

The location of j as computed from "3D camera data" obtained from the distance between j-l pair is given as $loc_{jl}^c$ $$loc_{jl}^c = loc_{lj}^1 + d_{jl}^c \quad (5)$$

The location of "j" obtained in equation (5) is through the location of "i". Hence the score for obtaining equation (5) is $S_i^1 * S_{jl}^c$ Thus the final fused location for $j^{th}$ individual is obtained as the weighted sum obtained from different observations, where the weights are the confidence scores of the individual observations is given by, $$loc_j = \frac{S_j^1 * loc_j^1 + S_j^m * loc_j^m + \sum_{l=1, l\neq j}^{N} S_l^1 * S_{jl}^c * (loc_l^1 + d_{jl}^c)}{S_j^1 + S_j^m + \sum_{l=1, l\neq j}^{N} S_l^1 * S_{jl}^c}, \quad (6)$$

$$\forall\ j = 1, 2, \ldots N$$

Where, N is the number of individuals in the proximity.

Figure 3:
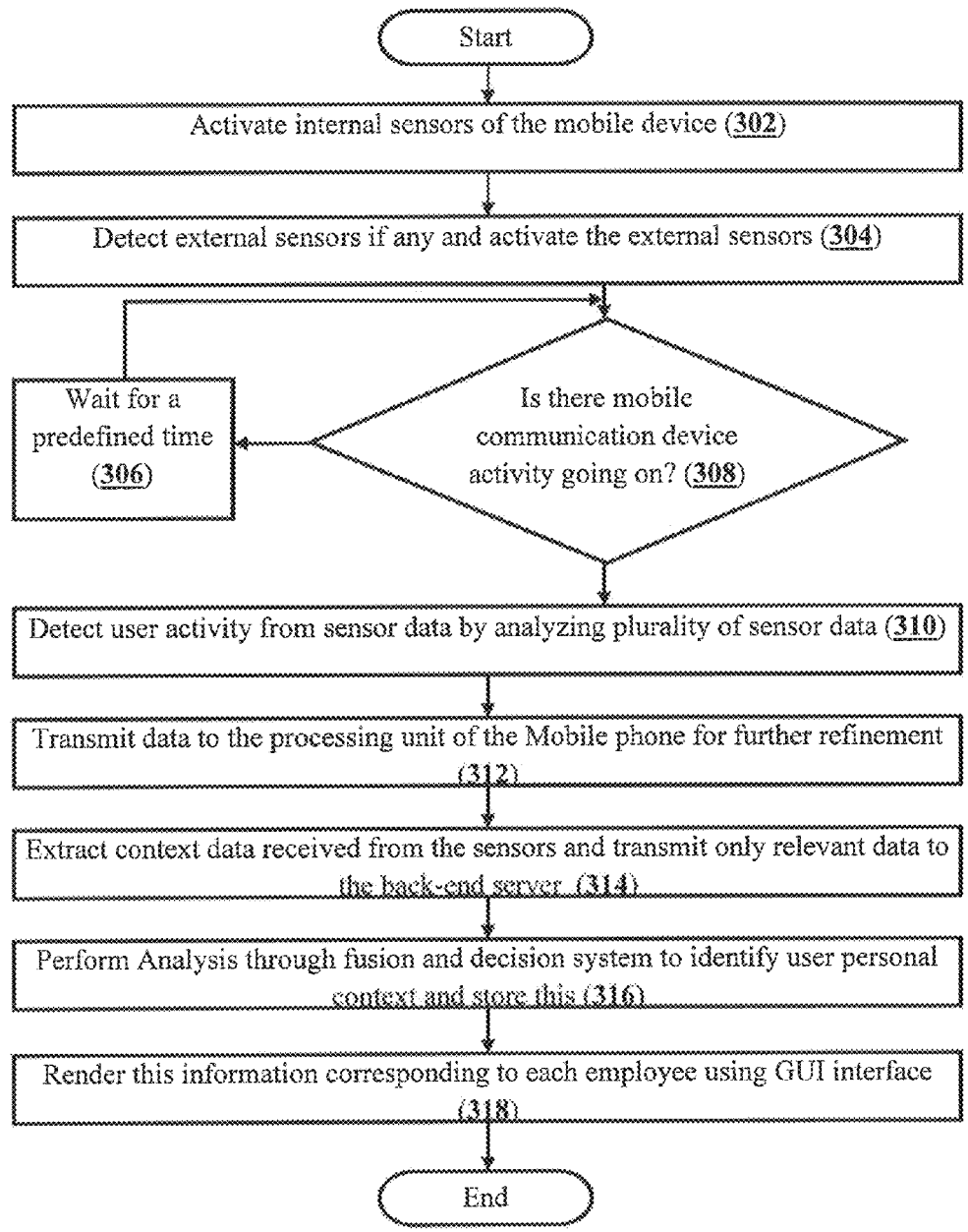
FIG. 3 illustrates a logical flow for identifying personal context, in accordance with an embodiment.

FIG. 3 illustrates the logical flow (300), as shown in step (302) the internal sensors (104) present in the mobile communication device (102) are activated for sensing information related to various activities done by a user. In step (304) the processing module (110) checks for presence of any external sensors and connects with them through a communication means like USB, Wi-Fi, Bluetooth and the like. As shown in step (306), the processing module (110) checks for any user activity such as downloading process or browsing occurring on the mobile communication device (102) as shown in step (308) and if so the processor module (110) waits for a predefined time step (306) and again checks for user activity. As presented in step (310) and (312) a check for any user activity occurring on the processing module (110) instructs the internal sensors (104) and external sensors (118) to sense user activity and transfer the captured data to the processing module (110). The processing module (110) then analyzes this data, separates context information and transmits only relevant information to the transmission module (114) which further transfers this information to the backend server (120) as shown in step (314). Specific to the sensors under consideration, the processing module (110) performs the following activities—accelerometer analytics for activity detection, baseband communication using ultrasound for localization and proximity detection, microphone captured audio analytics for emotion detection and neighborhood sensing, camera for ambient lighting detection and analysis of external physiological sensors such as EEG sensor for further insights into user context. At step (316) the back end server (120) and its underlying fusion and decision module performs analysis to identify user personal context and store this information in the data base (122). At step (318) this stored information is used by the front end applications (124) for creating individual and aggregated user context that can be used for Organizational Behavior Analysis, Workspace Ergonomics Analysis, Discovering the user's physical interaction network and also for Measuring and analyzing user response in User Studies etc.

Figure 4:
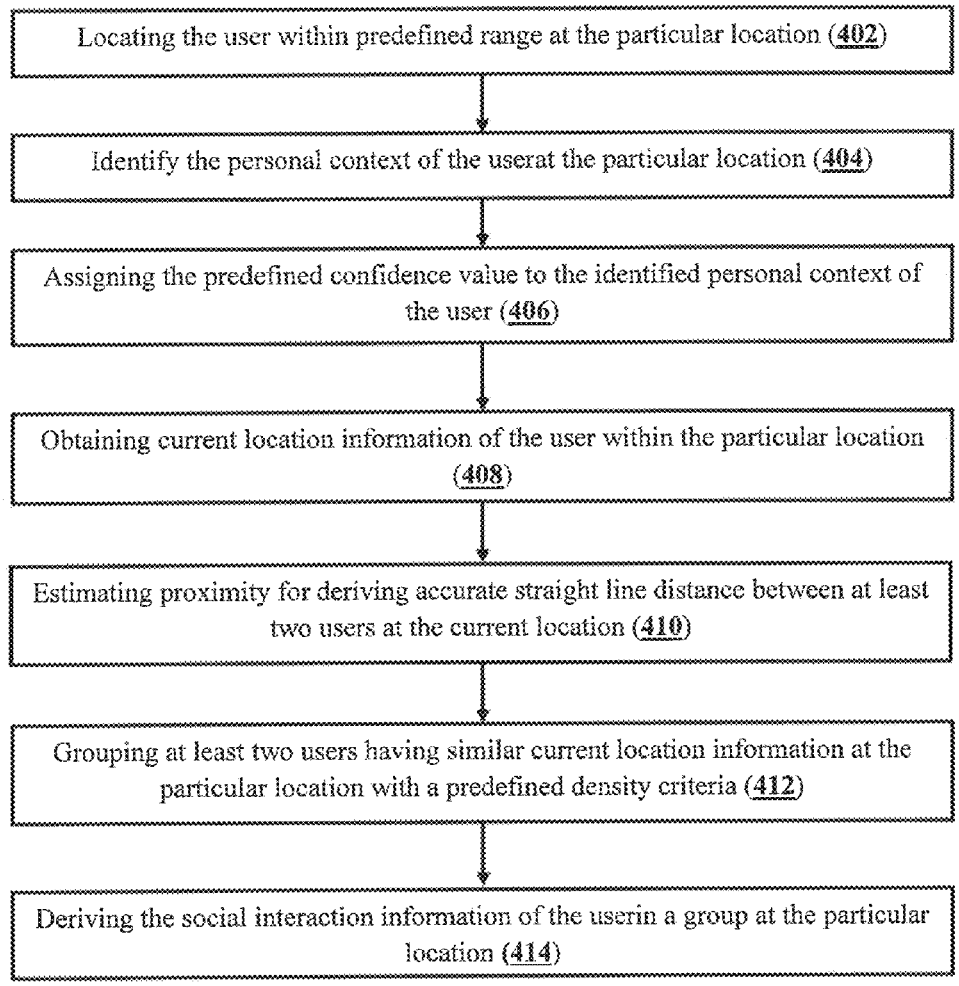
FIG. 4 illustrates the logical flow for personal context based social interaction, in accordance with an embodiment.

Referring to FIG. 4, the logical flow of the personal context based social interaction deriving method (400) is shown. As shown in step (402) the process starts by locating the user within predefined range at the particular location. At step (404) personal context of the user is identified using external sensors (118) and internal sensors (104) embedded in the mobile communication device (102). At the step (406) the identified personal context of the user is assigned a predefined confidence value. At the step (408) the precise current location information of the user is obtained within the particular location. At the step (410) the accurate straight line distance between at least two users at the current location is derived. At the step (412) the two users having similar current location information at the particular location are grouped together with the predefined density criteria. The process ends at step (414) wherein the social interaction information of the user in a group at the particular location is derived.

Figure 5:
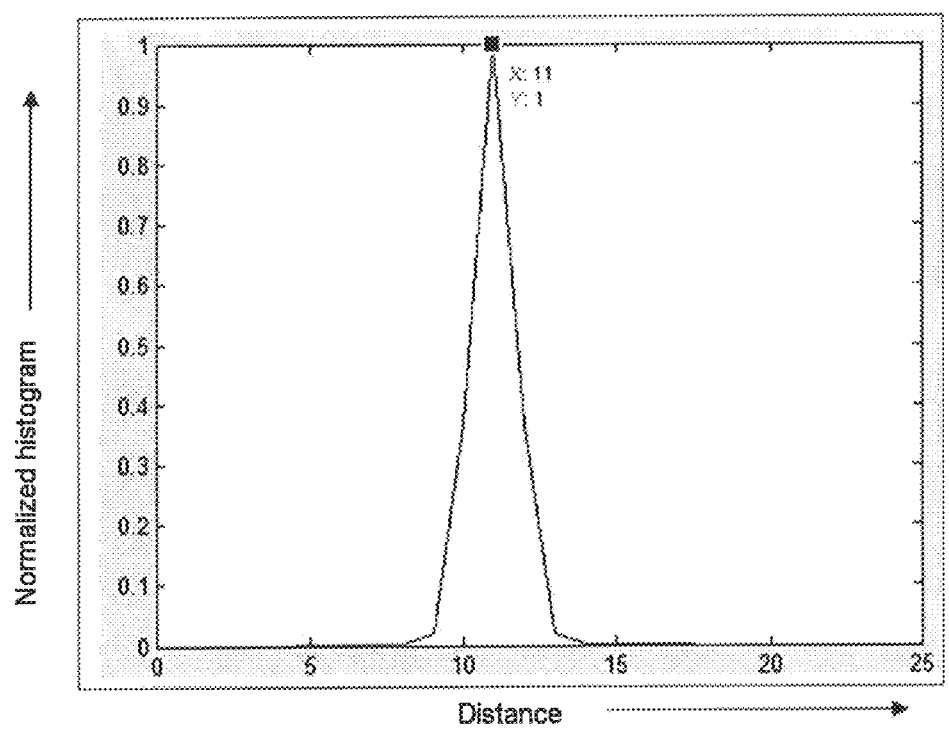
FIG. 5 depicts the normalized histogram representing number of phones being detected at the same location, in accordance with an exemplary embodiment of the present invention.

Referring to FIG. 5 as an exemplary embodiment of the present invention, depicts the normalized histogram representing number of phones being detected at the same location in which, a microphone sensor "i" which is static and its location is known, is considered. At a particular location $loc_k$, a mobile phone (j) may be used to play a sound at a known volume. The fixed microphone "i" receives the sound and computes a distance "$d_{kj}$". The distance may be computed with the principle that at the receiver using microphone sensors and the like, the attenuation of the volume of the sound is inversely proportional to the distance from the sound source. This computation is performed for N such phones. A histogram is computed on number of phones being detected at the same location. A sample normalized histogram plot is shown in FIG. 5. It is clear from the FIG. 5, that maximum numbers of phones are detected at a distance 11 units, this is the actual distance $d_k$. But, there may be certain non-zero phones whose distance is detected as different from $d_k$. This may be due to the error in observation, difference in phone models, and environmental effects. This process is repeated for all the $loc_k$ or equivalently $d_k$. Every time when the receiver observes a distance "$d_{kj}$", there is a confidence score "$S_{jk}$" associated with the observation. The function shown in FIG. 5 gives $S_{jk}$ to derive the probability distribution $P_{jl}(x/loc_k)$ of the observed value given a distance $d_k$. During the actual detection process, based on the received sound from the mobile phone, the probability of the location $loc_k$ observed by $i^{th}$ sensor is $P_{jl}(loc_k/x)$. This is obtained using Bayes equation.

We claim:

1. A method for identifying personal context of at least one user having a portable mobile communication device at a location for deriving social interaction information of the user, the method comprising:

determining a location of at least one user within a predefined range by identifying a personal context of the user at the location, wherein the personal context of the user is identified using at least an external sensor and an internal sensor embedded in the mobile communication device;

assigning predefined confidence values to the identified personal context, wherein the predefined confidence value is associated with a probability distribution function and an observation from a given sensor;

obtaining current location information relating to the user at the location by fusing the assigned confidence values;

grouping, based on predefined density criteria, at least two users having similar current location information at the location of the user;

estimating, using the external sensor and internal sensor, a straight line distance between the at least two grouped users; and deriving social interaction information of the user by fusing the current location information of the user, the estimated straight line distance, and data received from a web sensor.

2. The method of claim 1, wherein the personal context of the user is at least one of an identity, proximity, an activity, and a location.

3. The method of claim 1, wherein the mobile communication device is at least one of a mobile, phone, a smartphone, a laptop, a palmtop, and a personal data assistant (PDA).

4. The method of claim 1, wherein the external sensor is at least one of a building management system (BMS), a 3-D depth camera, and an ultrasound sensor.

5. The method of claim 1, wherein the internal sensor is at least one of an accelerometer, a magnetometer, a speech recognizer, a Bluetooth RSSI, and a wireless frequency (Wi-Fi) signature.

6. The method of claim 1, wherein the predefined density criteria is derived using a density based clustering method.

7. The method of claim 1, wherein the external sensor and the internal sensor are physical sensors.

8. The method of claim 1, wherein the web sensor is at least one of a social networking website profile of the user, email headers associated with the user, an RSS feed, and a social blog profile of the user.

9. The method of claim 1, wherein;
the external sensor and the internal sensor are communicatively coupled with a processing module;
the external sensor transmits sensory data to the processing module via an external sensor interface; and
the internal sensor transmits sensory data to the processing module directly.

10. The method of claim 9, wherein the sensory data transmitted by the external sensor and the internal sensor is stored in an internal memory communicatively coupled with the processing module.

11. The method of claim 1 wherein the derived social interaction information is displayed using a front end application.

12. The method of claim 1, wherein the derived social interaction information is at least one of an interaction while working in cubicle, an interaction while leading a meeting, an interaction of a presenter in a session, a passive listener in meeting, and an interaction during a group discussion.

13. The method of claim 1, wherein the fused confidence value, the fused current location information, and the personal context of the user are stored in a database that is communicatively coupled to a back end server.

14. The method of claim 1, further comprising switching between other mobile device applications of the internal sensor and personal context of the user when an interrupt is generated from regular activities of the mobile communication device.

15. A system for identifying a personal context of at least one user at a location for deriving social interaction information of the user, the system comprising:

a mobile communication device, comprising:
an internal sensor adapted for sensing a personal context of the user and sending the personal context to a processing module of the mobile communication device;
the processing module adapted to perform on-board processing of sensory data received from an external sensor and the internal sensor;
an internal memory communicatively coupled with the processing module and adapted to store the processed sensory data;
a transmission module adapted to transmit the processed sensory data to a back end server hosting a fusion engine and communicatively coupled to a database adapted to store fused confidence values, fused current location information of the user, and the personal context of the user; and
a switching module adapted for switching between other mobile device applications of the internal sensor and the personal context of the user when an interrupt is generated from regular activities of the mobile communication device; and wherein the external sensor is adapted for sensing the personal context of the user and sending the personal context of the user to the processing module via an external sensor interface of the mobile communication device, and wherein the back end server is adapted for fusing assigned predefined confidence values of the personal context of the user, current location information of the user, and a derived accurate straight line distance between at least two users in a group at a location of the user.

16. The system of claim 15, wherein the system further comprises:

a localization module adapted for locating at least one user within a predefined range by identifying the personal context of the user at the location, wherein the personal context of the user is identified using the external sensor and the internal sensor;

a confidence value assignment module adapted for assigning the predefined confidence values to the identified personal context of the user, wherein the predefined confidence value is associated with a probability distribution function and an observation from a given sensor;

a current location identification module adapted for obtaining current location information of the user within the location by fusing the assigned confidence values using a fusion engine;

a grouping module adapted for grouping, using a predefined density criteria, at least two users having similar current location information at the location; and a proximity estimation module adapted for estimating, using the external sensor and the internal. sensor, an accurate straight line distance between the grouped at least two users;

wherein the fusion engine is adapted for deriving the social interaction information of the user by fusing the current location information of the user and estimated accurate straight line distance.

17. The system of claim 15, wherein the mobile communication device is at least one of a mobile phone, a smartphone, a laptop, a palmtop, and a. personal data assistant (PDA).

18. The system of claim 15, wherein the external sensor is at least one of a building management system (BMS), a 3-D depth camera, a wearable EEG, and an ultrasound sensor.

19. The system of claim 15, wherein the internal sensor is at least one of an accelerometer, a magnetometer, a speech recognizer, and a Wi-Fi signature.

20. A non-transitory computer readable medium storing machine readable instructions executable by one or more processors for:
- determining a location of at least one user within a predefined range. by identifying a personal context of the user at the location, wherein the personal context of the user is identified using at least an external sensor and an internal sensor embedded in the mobile communication device;
- assigning predefined confidence values to the identified personal context wherein the predefined confidence value is associated with a probability distribution function and an observation from a given sensor;
- obtaining current location information relating to the user at the location by fusing the assigned confidence values;
- grouping, based on predefined density criteria, at least two users having similar current location information at the location of the user;
- estimating, using the external sensor and internal sensor, a straight line distance between the at least two grouped users; and
- deriving social interaction. information of the user by fusing the current location information of the user, the estimated straight line distance, and data received from a web sensor.

* * * * *